United States Patent [19]

Milliman

[11] 4,424,896
[45] Jan. 10, 1984

[54] DUST FEED MECHANISM

[75] Inventor: Edward M. Milliman, Benton City, Wash.

[73] Assignee: The United States of America as represented by the United States Department of Energy, Washington, D.C.

[21] Appl. No.: 251,660

[22] Filed: Apr. 6, 1981

[51] Int. Cl.³ .............................................. B65G 33/00
[52] U.S. Cl. .................................. 198/545; 198/608; 198/659
[58] Field of Search ............... 198/545, 608, 659, 671, 198/662, 666, 533, 548; 222/410, 412, 414, 236, DIG. 1; 406/69; 239/142

[56] References Cited

U.S. PATENT DOCUMENTS

| 657,998 | 9/1900 | Williams | 198/548 |
|---|---|---|---|
| 1,464,799 | 8/1923 | Anderson | 406/69 |
| 2,321,526 | 4/1941 | Scouten | 198/548 |
| 2,615,587 | 10/1952 | Beyer et al. | 198/662 |
| 3,684,082 | 8/1972 | Wardell | 198/659 |
| 3,858,714 | 1/1975 | Atwater | 198/659 |
| 4,192,418 | 3/1980 | Montgomery | 198/659 |

Primary Examiner—Robert J. Spar
Assistant Examiner—Jonathan D. Holmes
Attorney, Agent, or Firm—Jeannette M. Walder; Walter L. Rees; Richard G. Besha

[57] ABSTRACT

The invention is a dust feed device for delivery of a uniform supply of dust for long periods of time to an aerosolizing means for production of a dust suspension. The device utilizes at least two tandem containers having spiral brushes within the containers which transport the dust from a supply to the aerosolizer means.

9 Claims, 2 Drawing Figures

DUST FEED MECHANISM

CONTRACTUAL ORIGIN OF THE INVENTION

The United States Government has rights in this invention pursuant to Contract No. DE-AC06-76RLO-1830 between the U.S. Department of Energy and Battelle Pacific Northwest Laboratories.

BACKGROUND OF THE INVENTION

The reliable and effective conveyance and dispersal of fine solid particles for production of a uniform dust aerosol suspension is fraught with difficulties which may be characterized by two problem areas: (1) the feeding of bulk dust at a uniform desired rate, and (2) the dispersal of agglomerates within the bulk dust to provide a uniform dust particle size to the aerosolizing means.

The solution of these problem areas has been most successful to date by use of devices which involve the controlled abrasion of a cake of compacted powder by use of jets of compressed air or by some mechanical scraping means. One of the most acceptable devices of this category is the Wright dust feeder (see Mercer T. T., "Aerosol Technology in Hazard Evaluation," pp. 349-351, Academic Press, New York, 1973 and Wright, B. N., "Wright Dust Feed Mechanism", Journal of Scientific Instrumentation, Volume 27, pp. 12-15, 1950). In the Wright device, the dust tube contains the compressed dust or powders to be dispersed and the dust tube rotates about a scraper head piece having a slot in the head. A small amount of dust is scraped into the slot with compressed air forced through the slot, propelling dust from the slot through a passageway. The dust in the passageway is directed at high velocity against a plate which breaks up any aggregated particles and the divided dust is outputed through some nozzle means to produce a dust aerosol. However, the Wright device loses some of its reliability and effectiveness at very low powder dispersion rates, is quite complicated as well as costly, and is usually unsuitable for dusts containing a significant fraction of particles larger than 10 micrometers in diameter because of problems in forming a cohesive powdered cake of such larger particles.

A convenient means to convey solids is a rotating, spirally wound auger (see U.S. Pat. No. 3,223,227, dated Dec. 14, 1965 to Dudte). However, for the reduced feed rates of interest for dust conveyance, smaller diameter auger dimensions and closer tolerances lead to binding and plugging of passageways by the dust.

It is therefore an object of the invention to provide a device of simple construction capable of delivering a uniform and reliable quantity of dust for aerosolization.

It is a further object of the invention to provide a dust aerosol device in which the metering and conveying of dust is carried out by a tandem auger structure with the auger elements being flexible spiral wound brushes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This device provides an uncomplicated and inexpensive means for the production of a dust aerosol of uniform concentration over long periods of time. The dust feeding mechanism is composed of at least two coupled containers having a spiral wound flexible brush within each container. Dust is fed into the larger container and dust is then transferred by the spiral brush in the larger container to an opening in the smaller container. The dust deposited through the opening into the smaller container is transferred by the smaller spiral brush to the aerosolizer means for production of the desired dust suspension

DETAILED DESCRIPTION OF THE PREFERRED EMBODIMENT

Figure 1:
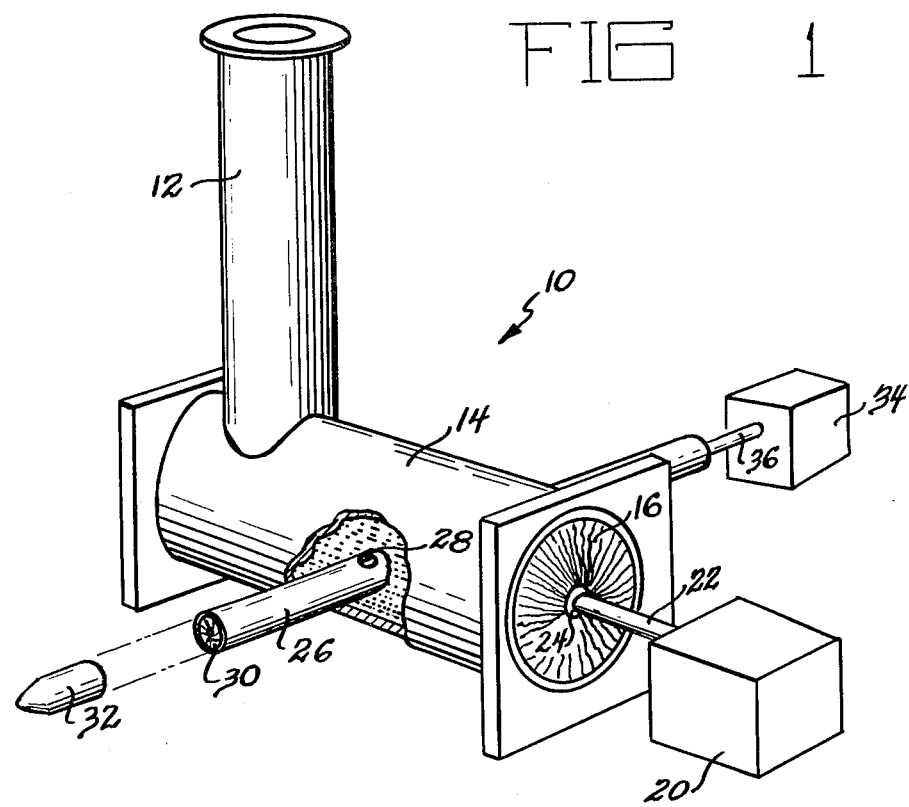
FIG. 1 shows one embodiment of the dust feed mechanism.

FIG. 1 illustrates one possible embodiment for the structure of the dust feed device 10. The device typically has a means for introduction of dust into dust feed device 10. For example, hopper supply tube 12 may introduce dust into hopper cylinder 14. Cylinder 14 contains spiral hopper brush 16 which conveys the dust along cylinder 14. Spiral brush 16 is typically of larger diameter than the inside diameter of cylinder 14 which results in brush 16 being compressed by the inside wall of cylinder 14. As a consequence of compression, spiral brush 16 forms a spiral fan which insures transport of all dust along cylinder 14. Suitable brush diameters and bristle character for brush 16 result in a well defined, almost continuous fan configuration with cylinder 14. Furthermore, since brush 16 is compressed, the bristles of brush 16 should be flexible in order to avoid any tendency for brush 16 to bind against the inside walls of cylinder 14. A hopper motor drive 20 is typically used to drive spiral brush 16, and motor drive 20 is connected to spiral brush 16 by drive rod 22 which is coupled to brush support rod 24.

Within hopper cylinder 14 is placed dust feed tube 26 which has one or more feed tube openings 28 which receive dust which has been transported by spiral brush 16 along hopper cylinder 14. Feed tube 26 should be positioned to avoid binding of hopper brush 16 and should also permit efficient transfer of dust from hopper cylinder 14 to feed tube 26. The diameter of tube 26 is constrained geometrically by the space available between drive rod 22 and the inside wall of cylinder 14 and is also limited by the pitch of spiral brush 16. The embodiment shown in FIG. 1 has the axis of feed tube 26 perpendicular to the axis of hopper cylinder 14 with both feed tube 26 and hopper cylinder 14 oriented in a horizontal position.

Figure 2:
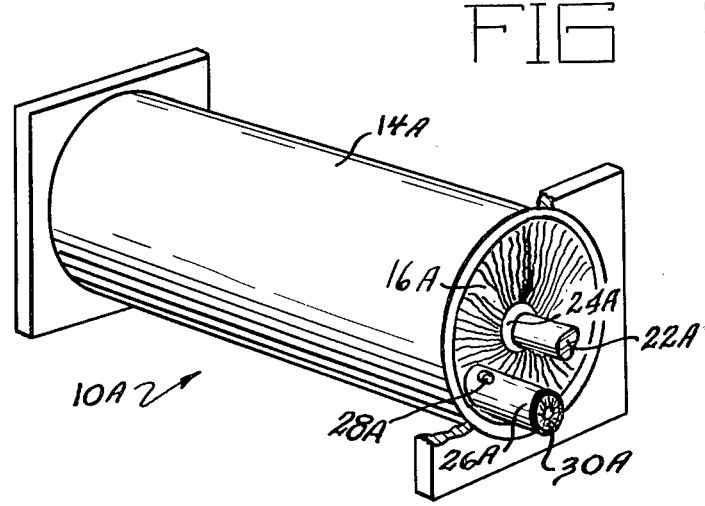
FIG. 2 shows another possible embodiment of the invention.

In FIG. 2 another typical arrangement 10A is shown with the axes of feed tube 26A and hopper cylinder 14A parallel to one another and also feed tube 26B and hopper cylinder 14A horizontally positioned. It is also possible to position the axis of feed tube 26A at some angle other than parallel or perpendicular to the axis of hopper cylinder 14A and to orient feed tube 26A and/or cylinder 14A in a vertical position.

In the embodiment of FIG. 1 within feed tube 26 is spiral feed brush 30 which transports dust along tube 26 to aerosolizer device 32. Typically, spiral brush 30 is turned by feed motor drive 34 coupled to feed brush rod 36. Both hopper brush 16 and feed brush 30 act to keep opening 28 clear, preventing any material from plugging or bridging opening 28. Feed brush 30 operates as a throttling device with hopper brush 16 supplying dust to opening 28 at a rate higher than feed brush 30 transports dust to aerosolizer 32. Therefore, the feed rate to aerosolizer 32 is independent of both the dust load in hopper cylinder 14 and of the rotational rate of hopper brush 16 for rather large ranges of operating parameters.

The output from dust feed device 10 was determined to change linearly with the rotational rate of feed brush 30. This was the case even in the situation of the use of device 10 for the transport of dust materials such as knife milled red phosphorus, which exhibited decaying outputs with time. At any given time, an increase in rotational rate of feed brush 30 resulted in a linearly increasing output. Therefore, even in the case of metering and feeding cohesive dusts, the device can be programmed to compensate for decaying output by a compensating increase in feed brush rotational rate.

EXAMPLE

Referring to FIG. 1, the dust feed device 10 can be constructed from any materials compatible with the use environment and the dust to be conveyed. A single spiral test tube brush may be used as feed brush 30 with a 12.7 mm outer diameter. The bristles of brush 30 were approximately 150 micrometers in diameter and were wound on a stem of about 2.2 mm diameter. The advance or lead of the brush spiral was approximately 2.5 mm per revolution. This type of brush was successfully used in feed tube 26 having inside diameters as small as 6.3 mm.

A typical inside diameter for hopper cylinder 14 is 50 mm and a typical length is 102 mm. These dimensions provide a working volume of $70 \times 10^{-6}$ m$^3$ of dust which enables operation under high exposure requirements to be carried out for an eight-hour period without refilling hopper cylinder 14. A laboratory-type bottle brush may be used as spiral hopper brush 16 with a length of 102 mm in this example case. An adequate geometry for opening 28 in feed tube 26 was determined to be a single hole of 6.3 mm in a diameter drilled perpendicular to the feed tube axis. A minimum torque of approximately 0.28 N·m was required to drive feed brush 30. Adequate rotational speeds were found to be about 0.5 to 45 rpm for feed brush 30 and approximately 20 to 40 rpm for hopper brush 16.

Dust delivery was measured by periodically weighing the material collected in a weighing boat or on a filter in the case of readily aerosolized dusts. Typical sampling times were five to ten minutes although greater times (as large as 30 to 60 minutes) were necessary in the case of a low delivery rate. In order to establish the output of device 10 for any material, a calibration must be performed for the given material and dust size distribution. The output of the dust feed device 10 was found to be nearly linearly proportional to the rotational rate of feed brush 30.

Delivery tests were performed for a variety of dusts including fly ash, amorphous silica powder pyrogenically formed and sold as Cab-O-Sil by Cabot Corporation, knife milled red phosphorus (a mixture of red phosphorus, butyl rubber, and an organic binder), and a mixture of knife milled red phosphorus and Cab-O-Sil.

The best results were obtained for fly ash with a nearly constant output over a two-and-one-half-day period. Unless ambient moisture is maintained at relatively low levels (less than 20% relative humidity) a slowly decaying output takes place over the two-and-one-half-day period. The absorption of moisture tends to cause agglomeration of the dust particles which impedes delivery of dust for aerosolization. Therefore, a controlled humidity environment may be necessary for the proper delivery of particular dust materials. A similar result was observed in the case of the material being Cab-O-Sil.

In the case of knife milled red phosphorous, the decay in the delivery rate was quite large with the dust adhering to the inside walls of hopper cylinder 14 and feed tube 26. Furthermore, in a reasonably short period of time, the feed tube opening 28 into feed tube 26 was plugged by packed red phosphorous dust. The addition of Cab-O-Sil to the red phosphorous mixture reduced the tendency of the dust to agglomerate and form clumps. In general, if the dust forms adherent clumps of size larger than the space between the bristles before the clumps can detach, these large clumps are delivered to feed tube opening 28. The delivery of such large clumps quickly results in the plugging of opening 28, and therefore causes cessation of delivery of material to the aerosol device.

Additional variables which have secondary effects on the operation of dust feed device 10 include the bristle density, degree of compression of the bristles on the inside walls of hopper cylinder 14 and feed tube 26, and the angle between the longitudinal axis of feed tube 26 and hopper cylinder 14, and the orientation of feed tube 26 and hopper cylinder 14 with respect to the vertical.

Brush wear is not a serious problem with the only major wear occuring on the hopper brush 16 where the bristles of brush 16 pass over feed tube 26. Pieces of brush can be found in the delivered powder but are generally of a large size (about 2 mm in length) which has an insignificant effect upon the quality of dust delivered for aerosolization. Replacement of the brushes is readily accomplished due to the simplicity of design.

I claim:

1. A device for uniformly feeding dust to aerosolizing means comprising:

a hopper for receiving dust;

a rotatable hopper brush positioned within the hopper;

a feed tube having an opening and coupled to the hopper such that dust from the hopper may be transferred to the feed tube through the opening in the feed tube and aerosolizing means at an end of said feed tube;

a rotatable spiral feed brush positioned within said feed tube;

means to drive the feed brush so as to feed dust through said feed tube to said aerosolizing means; and means to drive the hopper brush wherein with the means driving the brushes dust is delivered to the feed brush at a rate greater than the rate that dust is delivered to the aerosolizing means.

2. The device of claim 1 wherein the feed tube is so positioned with respect to the hopper brush that rotation of the hopper brush acts to clean the opening in the feed tube.

3. The device of claim 2 wherein both the hopper and the feed tube are cylindrical in shape.

4. The device of claim 3 wherein the opening in the feed tube is positioned in the cylindrical wall of the feed tube.

5. The device of claim 4 wherein the feed brush is a spiral brush having a diameter greater than the inside diameter of the feed tube.

6. The device of claim 3 wherein the axis of the hopper is perpendicular to the axis of the feed tube.

7. The device of claim 3 wherein the axis of the hopper is parallel to the axis of the feed tube.

8. The device of claim 2 wherein a portion of the feed tube passes through the hopper.

9. The device of claim 2 wherein the hopper brush is a laboratory bottle brush.

* * * * *